United States Patent
Crompton et al.

(10) Patent No.: US 9,664,318 B2
(45) Date of Patent: May 30, 2017

(54) FITTING ADAPTER WITH INTEGRATED MOUNTING ASSEMBLY AND DEVICE

(71) Applicant: Quick Fitting, Inc., Warwick, RI (US)

(72) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 42 days.

(21) Appl. No.: 14/585,808

(22) Filed: Dec. 30, 2014

(65) Prior Publication Data

US 2016/0186901 A1   Jun. 30, 2016

(51) Int. Cl.
*F16L 27/12* (2006.01)
*F16L 5/00* (2006.01)

(52) U.S. Cl.
CPC .............. *F16L 27/12* (2013.01); *F16L 5/00* (2013.01)

(58) Field of Classification Search
CPC ......... F16L 5/025; F16L 41/005; F16L 27/08; F16L 27/0804; F16L 27/0808; F16L 27/0861; F16L 27/12
USPC .......................................................... 285/46
See application file for complete search history.

(56) References Cited

U.S. PATENT DOCUMENTS

| | | | | | |
|---|---|---|---|---|---|
| 4,497,511 | A | * | 2/1985 | Barker | 285/136.1 |
| 5,052,721 | A | * | 10/1991 | Gorman, Jr. | 285/30 |
| 5,588,681 | A | * | 12/1996 | Parks | 285/46 |
| 6,145,893 | A | * | 11/2000 | Kuo | 285/302 |
| 7,025,392 | B2 | * | 4/2006 | Inoue et al. | 285/302 |
| 7,862,089 | B2 | * | 1/2011 | Crompton | 285/340 |
| 7,942,161 | B2 | * | 5/2011 | Crompton | 137/359 |
| 8,701,715 | B1 | * | 4/2014 | Crompton et al. | 138/44 |
| 8,764,066 | B1 | * | 7/2014 | Rice et al. | 285/302 |
| 2012/0169039 | A1 | * | 7/2012 | Crompton | F16L 37/091 285/18 |
| 2016/0131289 | A1 | * | 5/2016 | Spears | F16L 27/12 285/302 |

* cited by examiner

*Primary Examiner* — James M Hewitt
(74) *Attorney, Agent, or Firm* — Williams Mullen; Thomas F. Bergert

(57) ABSTRACT

An integrated fitting arrangement includes a mounting plate having a base portion and a stem portion, along with a sleeve member adapted to slidingly engage the stem portion of the mounting plate. By having sliding and/or telescoping capability, the sleeve can adapt its length to couple a piping element with a fitting element in a variety of applications. A release pusher element is provided as part of the sleeve member to facilitate the release of tubing, piping and other cylindrical objects inserted into a fitting.

24 Claims, 4 Drawing Sheets

FITTING ADAPTER WITH INTEGRATED MOUNTING ASSEMBLY AND DEVICE

FIELD OF THE INVENTION

The present invention relates to fluid flow systems, and more particularly to a fitting adapter assembly that facilitates a push connection and push release of fluid flow components.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the terms "pipe", "piping", "tube" or "tubing" will be understood to encompass one or more pipes, tubes, piping elements and/or tubing elements, and may be used interchangeably.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

Besides welding methods, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw®, BlueHawk®, CopperHead® and PushConnect® lines of push fittings and related products. Also, such technology is described, for example, in U.S. Pat. Nos. 7,862,089, 7,942,161, 8,205,915, 8,210,576, 8,398,122, 8,480,134, 8,844,974 and 8,844,981, the disclosures of which are incorporated herein by reference in their entireties.

In properly connecting pipes, fittings and other fluid flow parts, challenges arise in applications where the pipe must be perfectly cut to the proper distance. If the pipe is cut too short, traditional connection methods may not be used, or may require additional connections.

SUMMARY OF EMBODIMENTS OF THE PRESENT INVENTION

For purposes of the present disclosure, a fitting (also referred to as a fitting element or body member) can encompass a valve member and other piping elements including, but not limited to: a coupling joint, an elbow joint, a tee joint, a stop end, a ball valve member, tubing and other objects having cylindrical openings.

The present invention provides, in part, a push-fit fitting, adapter arrangement and integrated mounting assembly that facilitates the connection, mounting, dismounting, repair and re-use of piping system parts. The present invention can be employed with residential and commercial plumbing in bathroom, kitchens, laboratories and other areas incorporating fluid handling. The present invention eliminates the need to perfectly cut the length of pipe to be inserted by providing a telescoping sleeve member that slidably engages the stem portion of a mounting plate.

In various embodiments of the present invention, a fitting arrangement includes a mounting plate having a base portion and a stem portion, along with a sleeve member adapted to slidingly engage the stem portion of the mounting plate. By having sliding and/or telescoping capability, the sleeve can adapt its length to couple a piping element with a fitting element in a variety of applications. A fitting element and/or an escutcheon can also be part of the fitting arrangement of various embodiments of the present invention.

A release pusher element provided as part of the sleeve member of embodiments of the present invention is primarily employed to facilitate the release of tubing, piping and other cylindrical objects inserted into a fitting. The release pusher is manually pushed into the fitting body and tapered edges of the release pusher generally or nearly abut an installed fastening ring within the interior of the fitting.

When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

Embodiments of the present invention facilitate connections that must be made several inches away from a wall due to imperfect pipe lengths, for example. Once connected, the user may mount the assembly to a wall or surface utilizing the integrated valve mounting plate and mounting connectors and/or screws. To dismount the assembly, the user can slide the sleeve member toward the fitting, allowing the release pusher element to engage fastening ring teeth to lift the teeth off of the inserted tube. The final installation can include an escutcheon or wall plate to dress the final assembly and provide an end-of-travel surface for the sleeve member in various embodiments.

In various aspects, the present invention utilizes a push-to-connect feature on a fitting as an integrated assembly. A user can push the stainless steel, copper, CPVC or PEX pipe or tubing into the valve or fitting for an instant, permanent connection. In other aspects, the present invention comprises a dismountable fitting that is easily removed. In other aspects, the present invention comprises a fitting assembly with an integrated mounting plate, which allows for the connection and mounting of the valve to any type of tubing, hose or piping material including, but not limited to, copper, CPVC, stainless steel and PEX tubing or hose.

In various aspects, the present invention comprises a mounting assembly, which eliminates the requirement for solid tubing stub mounts, plumbing brackets, or plumbing mount preparation within a wall structure. This aspect allows for easy mounting in new or retrofit into existing plumbing or piping applications. In other aspects, the present invention comprises a fitting assembly, which includes a quick connection device, quick release and an optional mounting assembly.

DETAILED DESCRIPTION OF EMBODIMENTS

Figure 1:
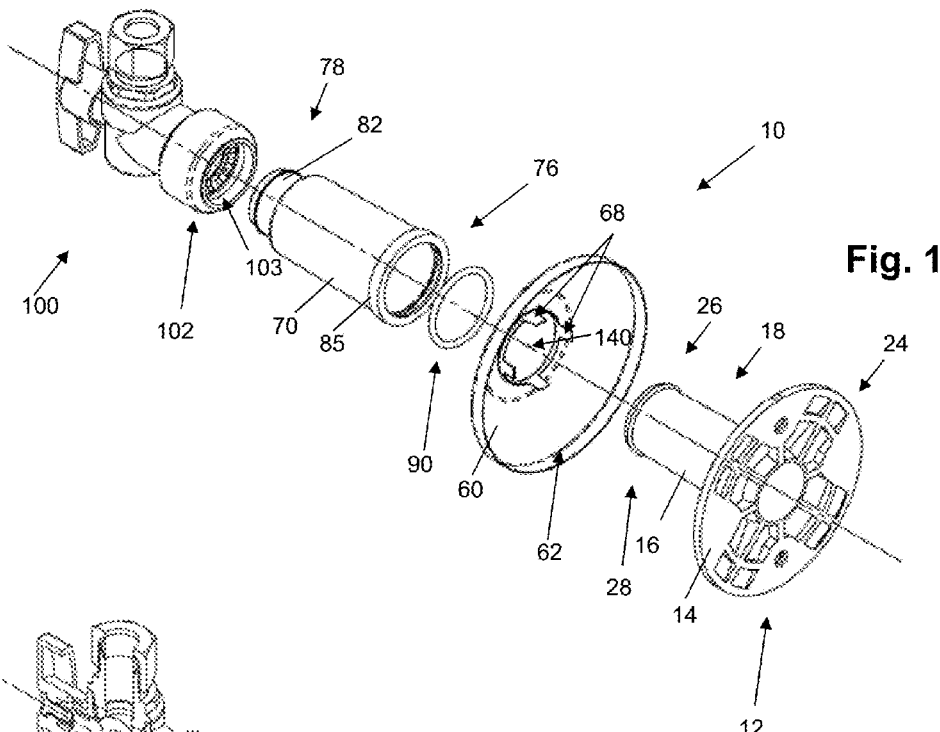
FIG. 1 is an exploded perspective view of a fitting arrangement in accordance with an embodiment of the present invention.

As shown in FIGS. 1 through 10, embodiments of the present invention provide a fitting arrangement 10 including a mounting plate 12, wherein the mounting plate 12 includes a base portion 14 and a stem portion 16. The stem portion 16 includes a generally cylindrical wall 18 having an internal axis 19, an inner surface 20 and an outer surface 22. The stem portion 16 extends from the base portion 14 at a first axial end 24 to a head portion 26 at a second axial end 28. In various embodiments of the present invention, the head portion 26 includes a circumferentially extending flange member 30 extending radially outwardly of the outer surface 22.

Figure 4:
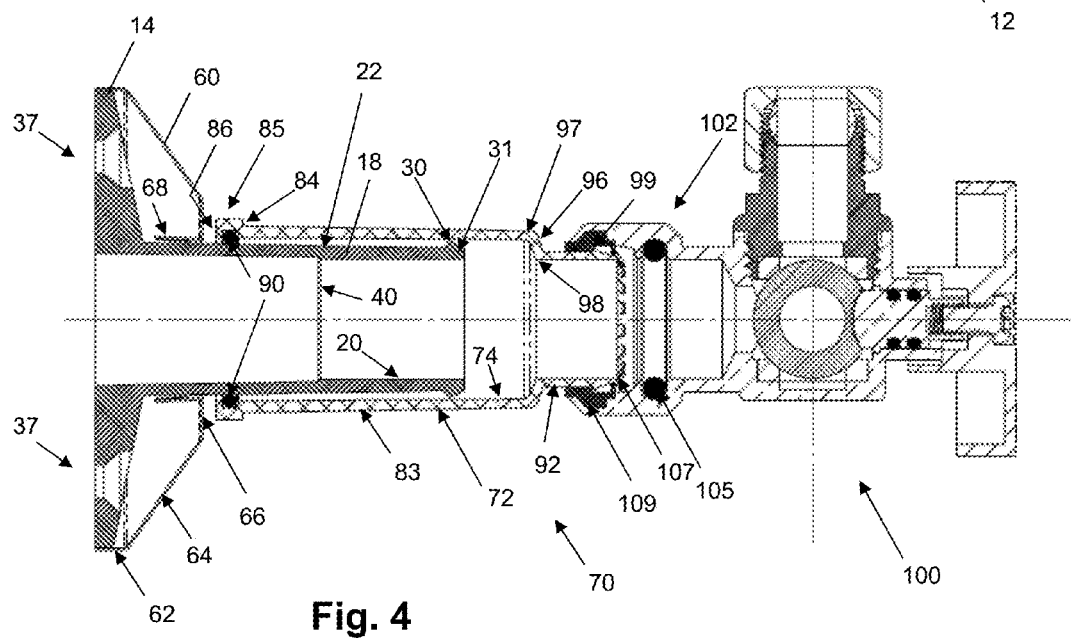
FIG. 4 is a front cross-sectional view of the arrangement of FIG. 1.
Figure 9:
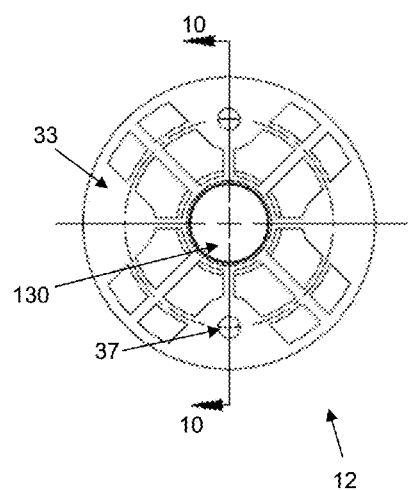
FIG. 9 is a left side view of a mounting plate element in accordance with an embodiment of the present invention.
Figure 10:
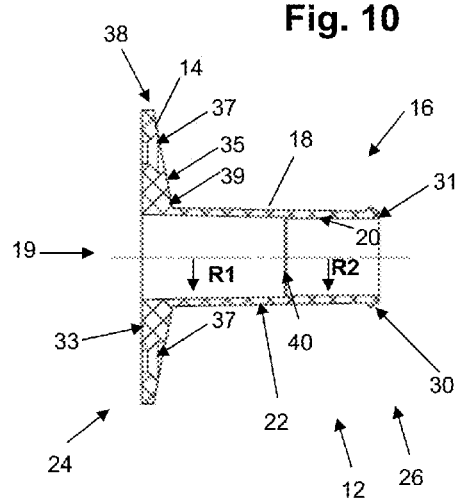
FIG. 10 is a cross-sectional view taken along the line 10-10 of FIG. 9.

As shown in FIGS. 4, 9 and 10, in various embodiments, the base portion 14 of the mounting plate 12 includes a bottom surface 33 and a top surface 35, with one or more openings 37 formed through the top 35 and bottom 33 surfaces of the base portion 14. Such openings 37 can permit securing devices, such as screws, for example, to extend therethrough and into a supporting surface, as will be described in more detail hereinafter. As further shown in FIGS. 9 and 10, in various embodiments, the bottom surface 33 is substantially perpendicular to the mounting plate axis 19, and the top surface 35 of the base portion 14 of the mounting plate 12 extends from an outer edge 38 of the base portion to an inner edge 39 adjacent the stem portion 16 at an angle such that the width of the base portion 14 at the outer edge 38 is less than the width of the base portion 14 at the inner edge 39, thereby providing greater support to the stem portion 16 during operation of various embodiments of the present invention.

As further shown in FIG. 10, the inner surface 20 of the stem portion wall 18 can be of non-uniform radius, varying in radial distance from the axis 19. For instance, radial distance R1 nearer to the axial first end 24 of the mounting plate 12 can be larger than radial distance R2 nearer to the axial second end 26 of the mounting plate 12. In various embodiments, a taper line 40 provides the axial point of the inner surface 20 where the radial distance changes from R1 to R2. Further, it will be appreciated that radius R1 need not be a consistent radial distance from the axis 19 to the inner surface 20 of the stem portion wall 18 between the taper line 40 and the first axial end 24 of the stem portion 16, but rather can be a tapered radial distance beginning from a larger measurement at or near the first axial end 24 and tapering to a smaller measurement at or near the taper line 40. In this way, the stem portion 16 of the mounting plate 12 can accommodate an inserted tube or piping element during operation, as the broader radial distance R1 at or near the first axial end 24 allows the tube or piping element to be more readily received, and the tapered distance (for example, as R1 tapers and/or as R1 changes to R2 at the taper line 40) facilitates a tighter fit to best minimize fluid flow problems during operation. In various embodiments of the present invention, the outer surface 22 of the stem portion wall 18 can be provided as having a substantially uniform radial distance from axis 19, or can be provided with a non-uniform or tapered radial distance that increases from the second axial end 26 toward the first axial end 24, notwithstanding the increased radial distance at flange 30. As shown in FIGS. 4 and 10, the stem portion 16 can further include an axially outer surface 31 at the second axial end 26, and the axially outer surface 31 acts as the lead axial surface for mating contact with the sleeve element 70 of embodiments of the present invention, as described in more detail hereinafter.

Figure 2:
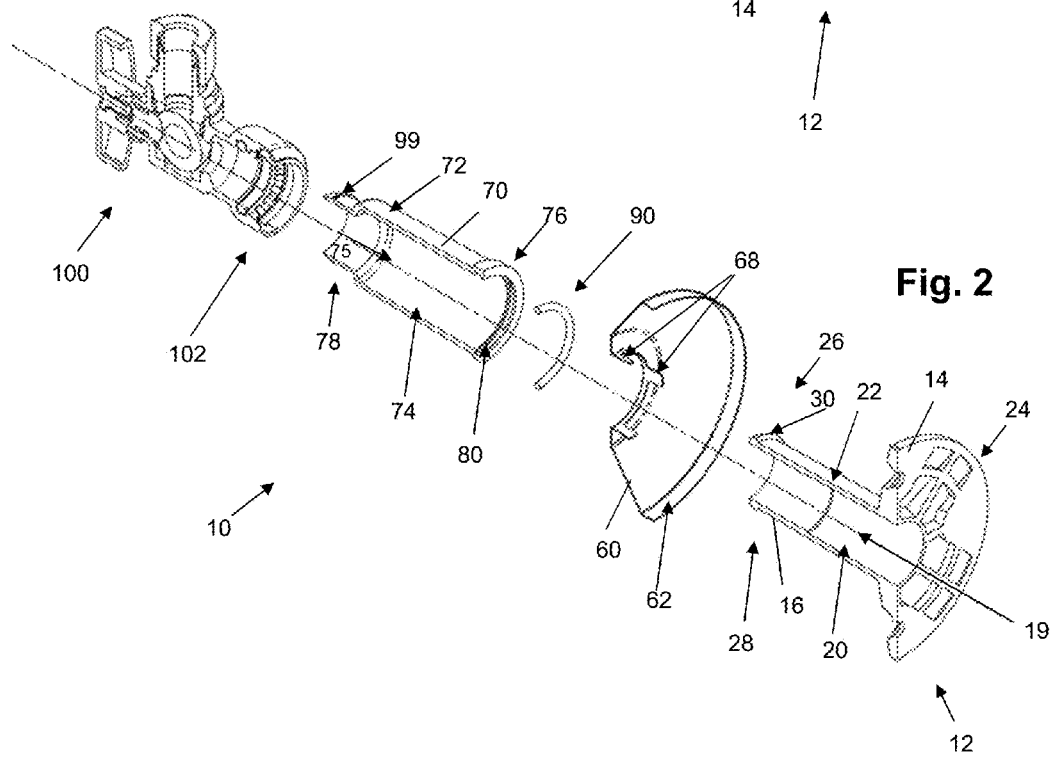
FIG. 2 is an exploded perspective cross-sectional view of the arrangement of FIG. 1.
Figure 3:
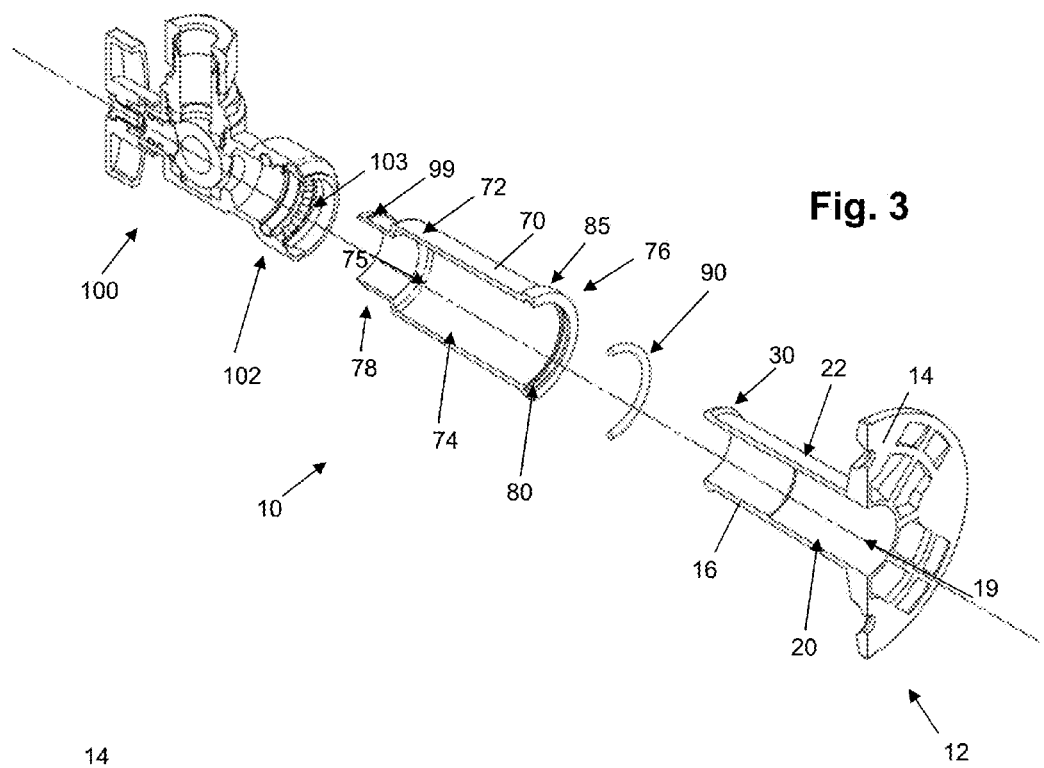
FIG. 3 is an exploded perspective view of a fitting arrangement in accordance with an additional embodiment of the present invention.

As further shown in FIGS. 1, 2, 4 and 5, embodiments of the present invention provide an escutcheon 60 that can facilitate covering mechanical elements (e.g., screws, openings) of the mounting plate 12 for aesthetic purposes, while also providing a surface 66 to provide resistance and/or an outer movement boundary for sleeve element 70. As shown in FIG. 4, one embodiment of an escutcheon 60 can include an outer base wall 62, an outer intermediate wall 64, an outer top wall 66 and an inner wall segment 68. The outer base wall 62 can fit securely about the outer edge 38 of the base portion 14 of the mounting plate 12, and the inner wall segment 68 can fit securely against the outer surface 22 of the stem portion wall 18. The outer top wall 66 can provide an end or stopping point surface for the sleeve element 70 during operation, as described in more detail hereinafter. In various embodiments, the inner wall segment 68 can comprise spaced apart tabs, as shown in FIGS. 1 and 2.

Figure 5:
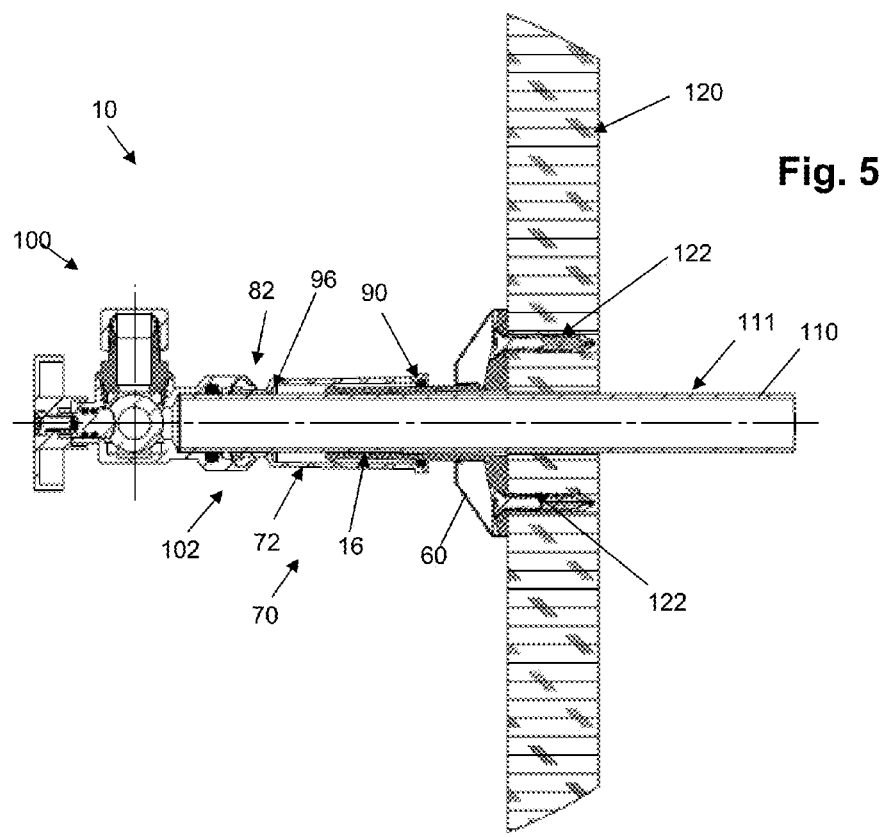
FIG. 5 is a rear cross-sectional view of an arrangement similar to the arrangement of FIG. 1, as installed.
Figure 6:
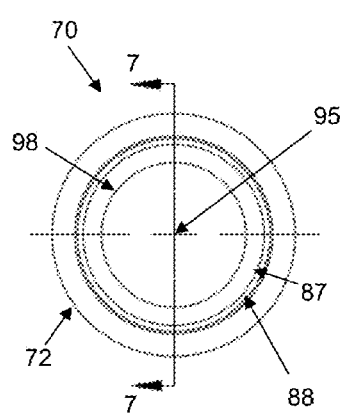
FIG. 6 is a left side view of a sleeve element in accordance with an embodiment of the present invention.
Figure 7:
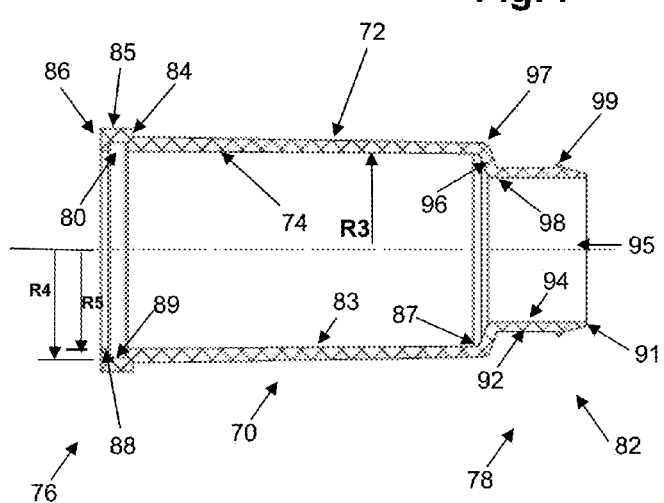
FIG. 7 is a cross-sectional view taken along the line 7-7 of FIG. 6.
Figure 8:
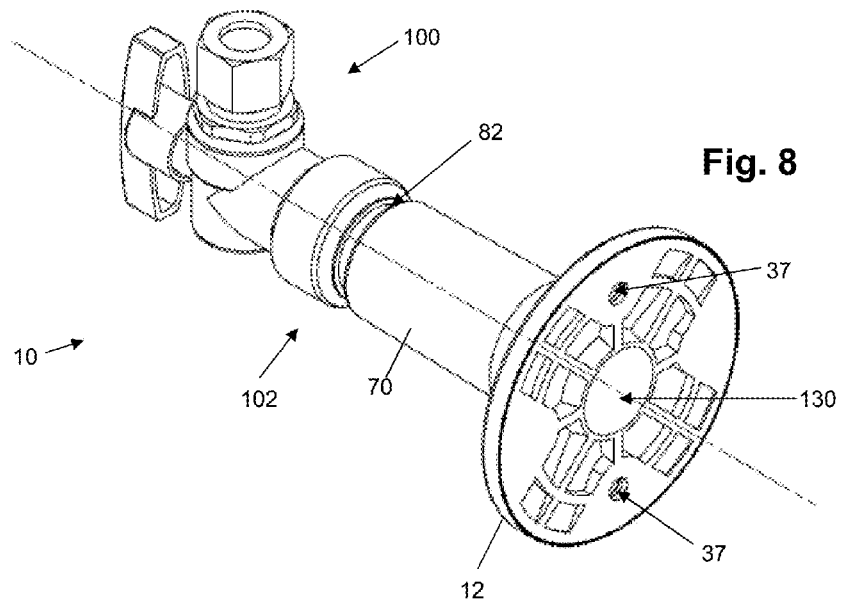
FIG. 8 is a perspective view of a fitting arrangement in accordance with an embodiment of the present invention.

As shown in FIGS. 1 through 8, embodiments of the present invention include a sleeve element 70 which is capable of telescoping and/or slidable engagement with the stem portion 16 of the mounting plate 12. In various embodiments, the sleeve element 70 is substantially cylindrical in shape, and includes an external surface 72 and an internal surface 74, with the internal surface 74 defining a cavity 75 extending axially therethrough. The sleeve element 70 includes a first axial end 76 and a second axial end 78, with the internal surface 74 at the first axial end 76 forming a retaining ring receiving compartment 80 and with an integrated release pusher element 82 being formed at the second axial end 78. As further shown in FIGS. 4 and 7, the sleeve element 70 has a body portion 83, and the retaining ring receiving compartment 80 includes a first retaining wall 84 extending radially outwardly from the body portion 83, an outer wall element 85 extending axially toward the first axial end 76 from the first retaining wall 84, and a second retaining wall 86 extending radially inwardly from the outer wall element 85. In this way, compartment 80 is formed, and compartment 80 can securely retain one or more o-rings or retaining rings 90, as shown in FIGS. 4 and 5, for example. In various embodiments, the radial distance R3 from the sleeve central axis 95 to the internal surface 74 of the body portion 83 is non-uniform. Further, the radial distance R4 from the central axis 95 of the sleeve element 70 to the inner surface 89 of the outer wall element 85 can be larger than the radial distance R3. In various embodiments, as shown in FIGS. 6 and 7, for example, the radial distance of the internal surface 74 of the body portion 83 tapers from a larger measurement at the second axial end 78, such as at point 88, to a smaller measurement near the first axial end 76, such as at point 87, for example. Such a tapered internal radial distance can facilitate proper sliding engagement of the sleeve element 70 with the stem portion 16 of the mounting plate 12, for example. It will be appreciated that the outer surface 72 of the sleeve element 70 can also be provided with a similar taper, so as to extend from a larger radial distance at the first axial end 76 to a smaller radial distance at the second axial end 78.

As shown in FIGS. 1 through 7, an integrated release pusher element 82 is formed at the second axial end 78 of the sleeve element 70. The release pusher element 82 can be integrally formed with the body portion 83 of the sleeve element 70, such that the sleeve element 70 is a monolithic element. The release pusher element 82 can include an outer surface 92, an inner surface 94, an axially outer edge 91, a partial end wall 96 extending radially inwardly from an axial end 97 of the body portion 83 of the sleeve 70. The release pusher element 82 can further extend axially from the radially internal end 98 of the partial end wall 96 to the outer edge 91. A circumferential lip 99 extends radially outwardly of the release pusher body portion outer surface 92. In various embodiments, the lip 99 extends from the release pusher body portion external surface 92 at an axial position between the axial outer edge 91 and the partial end wall 96. Further, as shown in FIGS. 4 and 7, the partial end wall 96 can extend radially inwardly at an angle to the normal of axis 95. In various embodiments, this angle can be between approximately one degree and approximately thirty degrees.

As further shown in FIGS. 1 through 8, embodiments of the present invention can include a fitting 100 having an axial end 102 with a substantially cylindrical opening 103 adapted to receive the release pusher element 82 of the sleeve member 70. The end 102 can include, among other elements, an o-ring 105, a fastening ring 107 and a tube support member 109, such as described, for example, in U.S. Pat. No. 8,844,981, the disclosure of which is incorporated by reference herein in its entirety. When inserted, the release pusher edge 91 can engage the fastening ring 107 and push the integrated fastening ring teeth away from an inserted tube. Once the tube is inserted, the release pusher can be withdrawn, thereby allowing the fastening ring teeth to engage the outer surface of the tube and provide resistive force to any tensile stress or pulling on the inserted tube. As such, the release pusher element 82 can be employed to facilitate the release of tubing, piping and other cylindrical objects inserted into the fitting 100. When it is desired to release an inserted pipe, for example, from the fitting, the release pusher element 82 can be forced in the direction of the fastening ring 107 such that its angular surfaces depress the fastening ring teeth off of the surface of the inserted pipe, thereby allowing the pipe to be removed.

In operation, in various embodiments, the sleeve element 70 is capable of sliding engagement from a position where the o-ring 90 engages the circumferential flange 30 of the stem portion 16 of the mounting plate 12 to a position where the partial end wall 96 of the release pusher element 82 engages the flange 30 of the stem portion 16 of the mounting plate 12. In other embodiments, the sleeve element 70 is capable of sliding engagement from a position where the o-ring 90 engages the circumferential flange 30 of the stem portion 16 of the mounting plate 12 to a position where the second retaining wall 86 engages the top wall 66 of the escutcheon 60. The sleeve element 70 can initially be coined or otherwise pressured over the flange 30.

As illustrated in FIG. 5, the mounting plate can be affixed to a wall 120 or other structure using one or more screws 122 or similar securing devices. The screws 122 can be positioned through the openings 37 in the base 14 of the mounting plate 12. When a tubing or piping element 110 is to be inserted through the wall 120, it can be manipulated through the opening 130 of the mounting plate 12 (and opening 140 of escutcheon 60 when the escutcheon 60 is employed) and through the interior of the stem 16. It will be appreciated that each of the sleeve 70 and stem portion 16 of the mounting plate has an internal diameter that allows for smooth and snug engagement of a pipe and/or fluid supply tubing element external surface 111. Depending upon whether the tube or piping element 110 is of adequate length, the sleeve element 70 may require adjusting by sliding as described above. Once at the appropriate length, the release pusher element 82 of the sleeve 70 can be inserted into the end 102 of the fitting 100, sufficiently far to engage the fastening ring 107 and permit the tube 110 to be inserted into the fitting end 102. Once the tube is sufficiently inserted, the sleeve 70 with release pusher element 82 can be positioned back so as to allow the fastening ring teeth within fitting end 102 to engage the external surface 111 of the inserted tube 110. In this way, the sleeve 70 and mounting plate 12 can adapt for inadequacies of axial length of a pipe or tubing element to be inserted into a fitting. The sleeve 70 and mounting plate 12 thus provide an adapter arrangement in accordance with embodiments of the present invention. To dismount the assembly, the user can slide the sleeve 70 toward the fitting 100 such that the release pusher element 82 again engages the fastening ring teeth, thereby pushing the teeth off of the inserted tube, whereby the tube can be retracted and removed from the fitting.

The o-ring 90 can be made of a polyamide material, and optional lubricant for the o-ring can be a food grade lubricant, for example. The sleeve member 70 and the mounting plate 12 can comprise injection-molded plastic or a metal material such as brass, for example. In one embodiment of the present invention, the release pusher element 82 can be provided with a thread on its outer surface for engaging a fitting having a threaded interior surface.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A device, comprising:
 a mounting plate, having a base portion and a stem portion, wherein the base portion has an outer edge with a first diameter; and
 a sleeve element slidably engaged with the stem portion of the mounting plate, with the sleeve element comprising an external surface and an internal surface, with the external surface having a second diameter that is smaller than the first diameter of the outer edge of the mounting plate base portion, with the internal surface defining a cavity extending axially therethrough, the sleeve element further having a first axial end and a second axial end, with the internal surface at the first axial end forming a retaining ring receiving compartment, wherein the sleeve element further has a body portion with a first axial end and a second axial end, and wherein the retaining ring receiving compartment includes a first retaining wall integrally formed with and extending radially outwardly from the sleeve element body portion, an outer wall element integrally formed with and extending axially toward the first axial end from the first retaining wall, and a second retaining wall integrally formed with and extending radially inwardly from the outer wall element, wherein the sleeve element, the retaining ring receiving compartment first retaining wall, the retaining ring outer wall element and the retaining ring second retaining wall are monolithic, and wherein the sleeve element body portion internal surface tapers in substantially frustoconical form from a first radial distance proximate the sleeve element body portion first axial end to a second radial distance proximate the sleeve element body portion second axial end, wherein the first radial distance is larger than the second radial distance.

2. The device of claim 1, further including an o-ring positioned within the retaining ring receiving compartment.

3. The device of claim 1, wherein the sleeve element body portion has a non-uniform radius.

4. The device of claim 1, wherein the sleeve element includes an integrated release pusher element at the second axial end, wherein the release pusher element includes a partial end wall extending radially inwardly from the body portion and a release pusher body portion extending axially outwardly from the partial end wall.

5. The device of claim 4, wherein the release pusher body portion has an external surface and a circumferential lip extending radially outwardly of the body portion external surface.

6. The device of claim 5, wherein the release pusher body portion has an axial outer edge, and wherein the lip extends radially outwardly from the release pusher body portion external surface at a position between the axial outer edge of the release pusher body portion and the partial end wall.

7. The device of claim 4 wherein the sleeve element has a central axis, wherein the partial end wall extends radially inwardly at an angle to the normal of the sleeve central axis of between approximately one degree and approximately thirty degrees.

8. The device of claim 1, wherein the stem portion includes an internal surface of non-uniform radius.

9. The device of claim 1, wherein the stem portion of the mounting plate has an external surface, and wherein the stem portion includes a circumferential flange extending radially outwardly of the external surface of the stem portion.

10. The device of claim 9, further including an o-ring positioned within the retaining ring receiving compartment.

11. The device of claim 10, wherein the sleeve element has an integrated release pusher element at the second axial end, wherein the release pusher element includes a partial end wall extending radially inwardly from the sleeve element body portion, and further wherein the sleeve element is capable of sliding engagement with the mounting plate from a position where the o-ring engages the circumferential flange of the stem portion to a position where the partial end wall of the release pusher element engages the flange of the stem portion of the mounting plate.

12. The device of claim 1, further including an escutcheon secured about the base portion of the mounting plate.

13. The device of claim 10, further including an escutcheon secured about the base portion of the mounting plate, wherein the sleeve element is capable of sliding engagement with the mounting plate from a position where the o-ring engages the circumferential flange of the stem portion to a position where the sleeve element engages the escutcheon.

14. A device, comprising:
 a mounting plate, having a base portion and a substantially cylindrical stem portion, wherein the base portion has an outer edge with a first diameter, and wherein the stem portion has an outer surface with a circumferential flange extending radially outwardly therefrom; and
 a sleeve element having a sleeve body portion and a release pusher body portion, wherein the sleeve body portion and release pusher body portion are monolithic, integrally formed and share a common central axis, with the sleeve element terminating at the release pusher body portion and further having an internal surface and an external surface, with the external surface having a second diameter that is smaller than the first diameter of the outer edge of the mounting plate base portion, wherein the sleeve element body portion is positionable such that the sleeve element body portion internal surface slidingly engages the circumferential flange and the release pusher body portion internal surface does not engage the circumferential flange, wherein the sleeve element external surface has a radial distance that is greater at the sleeve body portion than at the release pusher body portion, wherein the sleeve element internal surface has a radial distance that is greater at the sleeve body portion than at the release pusher body portion, wherein the sleeve element body portion has first and second axial ends, and wherein the sleeve element body portion internal surface tapers in substantially frustoconical form from a first radial distance proximate the first axial end to a second radial distance proximate the second axial end, wherein the first radial distance is larger than the second radial distance.

15. The device of claim 14, wherein the sleeve element has a first axial end and a second axial end, with the internal surface at the first axial end forming a retaining ring receiving compartment.

16. The device of claim 15, further including at least one o-ring within the retaining ring receiving compartment.

17. The device of claim 16, wherein the outer surface of the stem portion of the mounting plate slidingly engages the at least one o-ring.

18. The device of claim 14, wherein the release pusher element includes a partial end wall extending radially inwardly from the sleeve element body portion.

19. The device of claim 18, wherein the release pusher body portion extends axially outwardly from the partial end wall and has a uniform radial distance to the inner surface.

20. The device of claim 19, wherein the release pusher body portion includes a circumferential lip extending radially outwardly of the release pusher body portion external surface.

21. The device of claim 20, further including a fitting having an axial end adapted to receive the release pusher element.

22. The device of claim 14, wherein the stem portion of the mounting plate has an internal surface of non-uniform radius.

23. The device of claim 14, wherein the sleeve element body portion has a non-uniform radius.

24. The device of claim 15, wherein the retaining ring receiving compartment includes a first retaining wall extending radially outwardly from the sleeve element body portion, an outer wall element extending axially toward the first axial end from the first retaining wall, and a second retaining wall extending radially inwardly from the outer wall element.

* * * * *